United States Patent [19]

Picco et al.

[11] Patent Number: 5,653,411
[45] Date of Patent: Aug. 5, 1997

[54] CLAMP FOR CLAMPING PIPES

[75] Inventors: Pierluigi Picco, Pieve Ligure; Roberto Rossi, Savignone; Luigi Bisio, Alessandria, all of Italy

[73] Assignee: Bundy International Limited, Abingdon, England

[21] Appl. No.: 402,064

[22] Filed: Mar. 9, 1995

[30] Foreign Application Priority Data

Mar. 9, 1994 [IT] Italy .................. GE94A0023
Jun. 2, 1994 [IT] Italy .................. GE94A0070

[51] Int. Cl.⁶ .................. F16L 3/08
[52] U.S. Cl. .................. 248/74.1; 24/339; 248/68.1; 248/74.2
[58] Field of Search .................. 248/74.1, 65, 68.1, 248/69, 73, 74.2, 74.3; 24/543, 459, 339

[56] References Cited

U.S. PATENT DOCUMENTS

| | | | |
|---|---|---|---|
| 3,913,187 | 10/1975 | Okuda | 248/74.3 |
| 4,317,262 | 3/1982 | Wells, Jr. | 248/74.3 |
| 4,564,163 | 1/1986 | Barnett | 248/74.3 |
| 4,623,102 | 11/1986 | Hough, Jr. | 248/68.1 |
| 4,669,156 | 6/1987 | Guido et al. | 248/74.3 |
| 4,840,333 | 6/1989 | Nakayama | 248/68.1 |
| 5,020,749 | 6/1991 | Kraus | 248/74.3 |
| 5,044,583 | 9/1991 | Daigle et al. | 248/65 |
| 5,263,671 | 11/1993 | Baum | 248/68.1 |

FOREIGN PATENT DOCUMENTS

| | | | |
|---|---|---|---|
| 97703 | 4/1990 | Japan | 248/74.1 |
| 2 202 270 | 9/1988 | United Kingdom . | |

Primary Examiner—Leslie A. Braun
Assistant Examiner—Anita King
Attorney, Agent, or Firm—Jacobson, Price, Holman & Stern, PLLC

[57] ABSTRACT

A clamp for clamping pipes, especially but not exclusively for combustion engine supply pipes, comprises a body (1) with at least two housing seats (2) which are adjacent and provided with two sidepieces (102, 202) which encompass a pipe (3) laterally. A coupling notch (4) for a catch-type distance piece (5) is provided between the adjacent sidepieces (102, 202) of two adjacent housing seats (2), the catch-type distance piece being borne by a clamping bracket (6) which can be clamped against the body (1) itself. According to the invention the catch-type distance pieces (5) and at least one of the associated external surfaces of at least one sidepiece (102, 202) have respectively at least a complementary tooth (105, 302) or respectively a tooth and a complementary reciprocal clamping notch. The catch-type distance pieces (5) and at least one of the two adjacent sidepieces (202) are advantageously provided with cooperative toothed portions (105, 302) which are matching or complementary and in the manner of the teeth of a saw, whilst the toothed portion (105) of the catch-type distance pieces is directed with the less steep sides in the coupling direction and the toothed portion (302) of the sidepiece (202) is directed in the opposite direction.

13 Claims, 5 Drawing Sheets

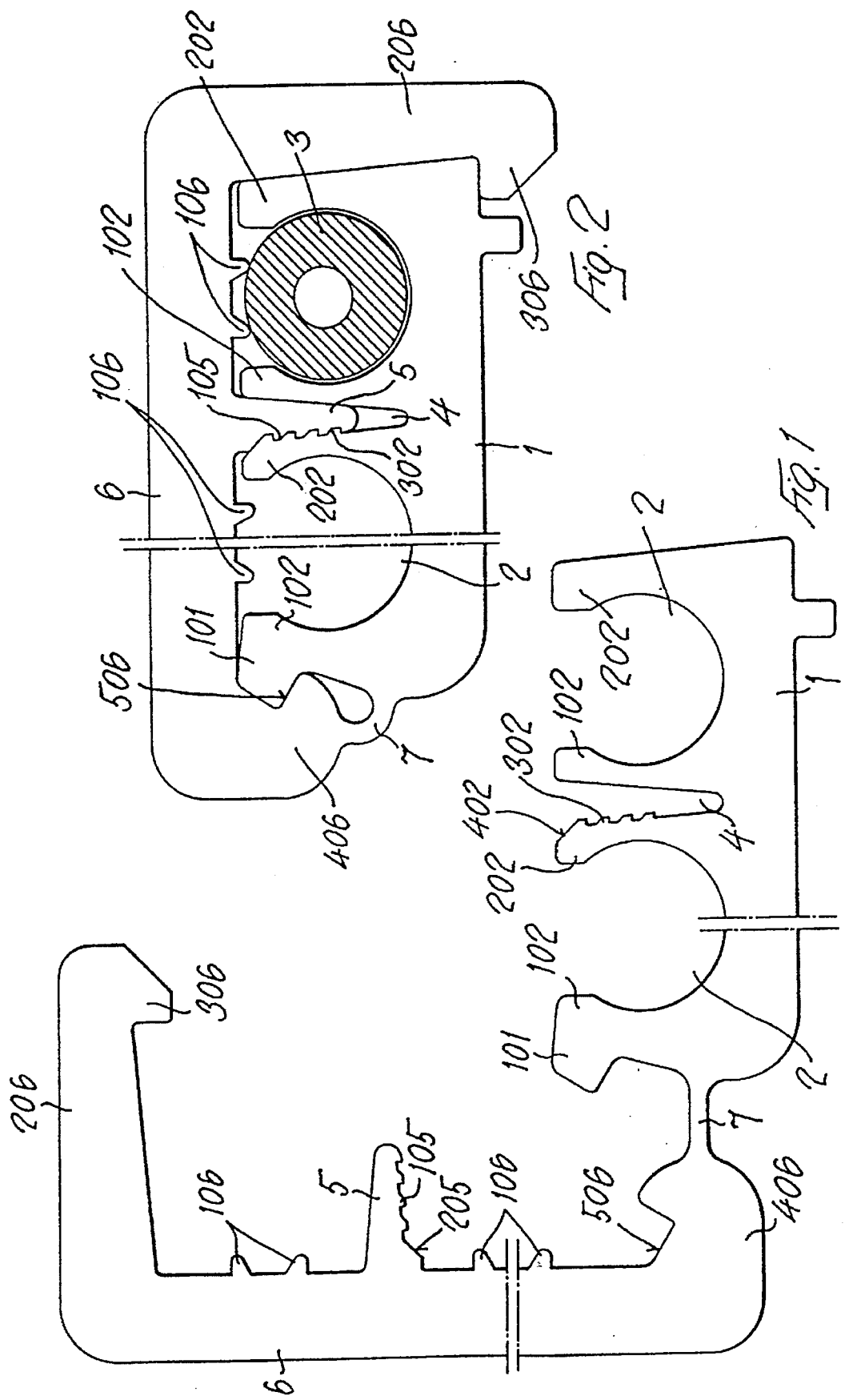

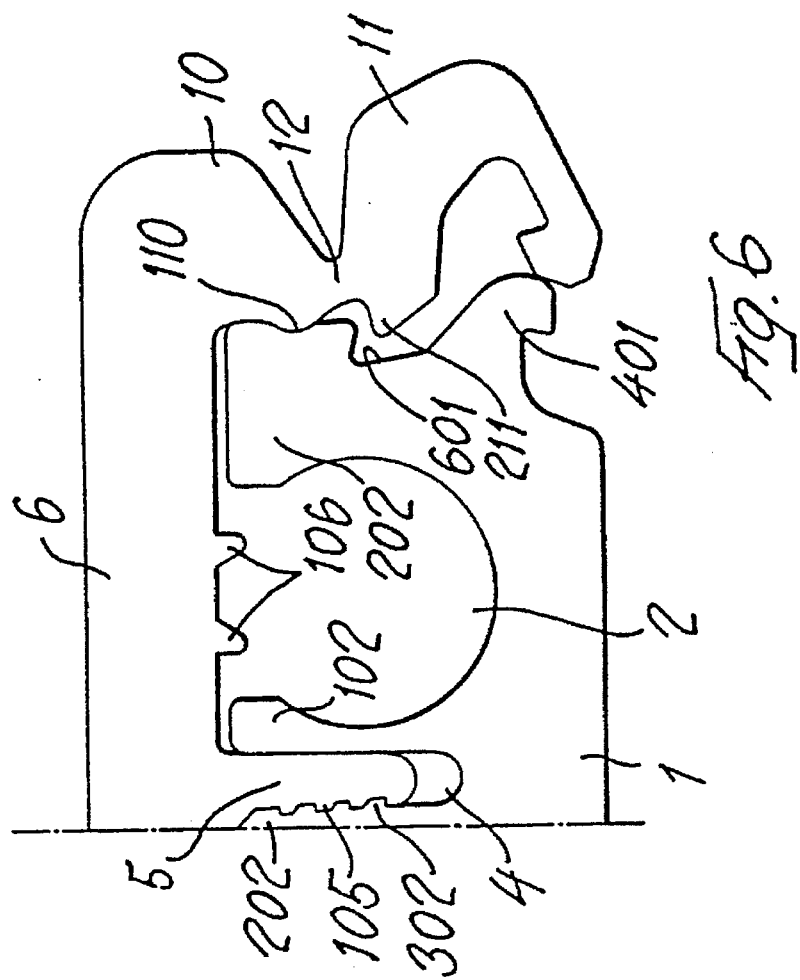
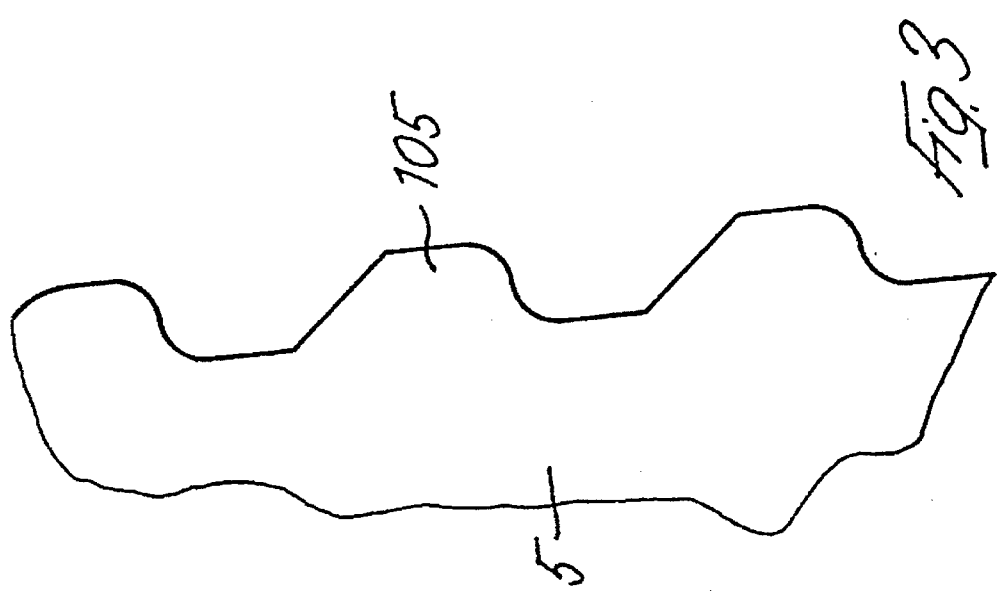

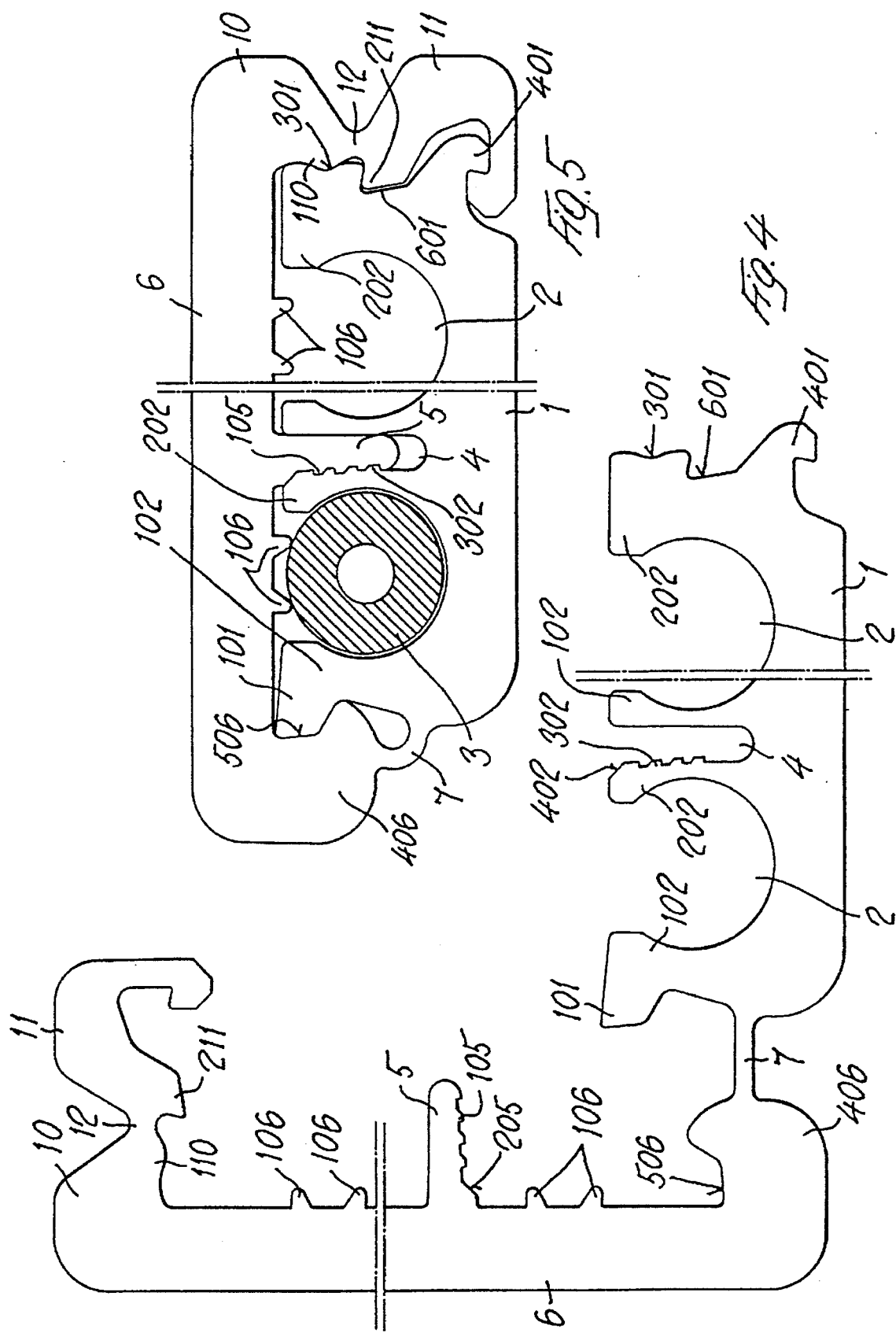

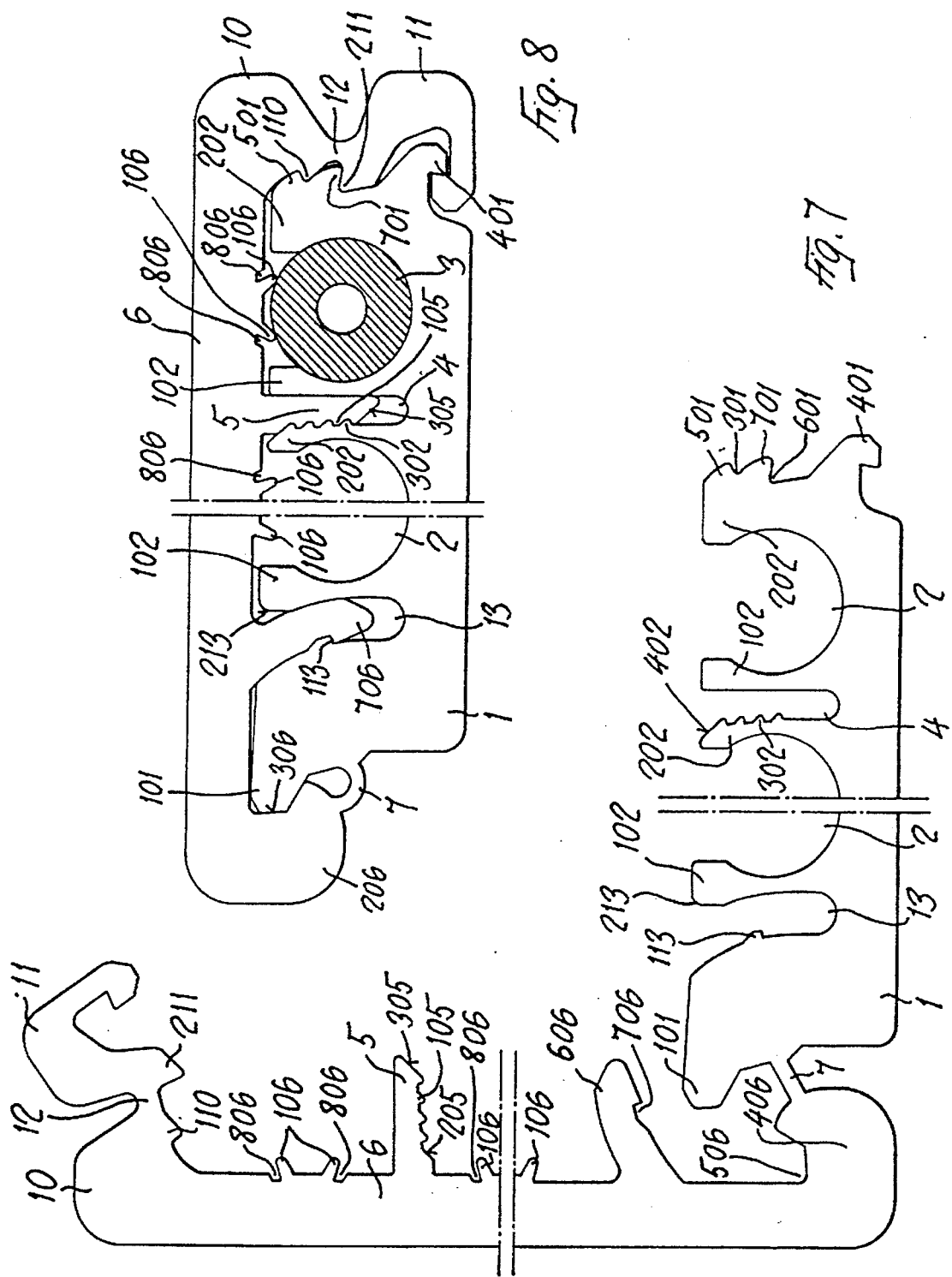

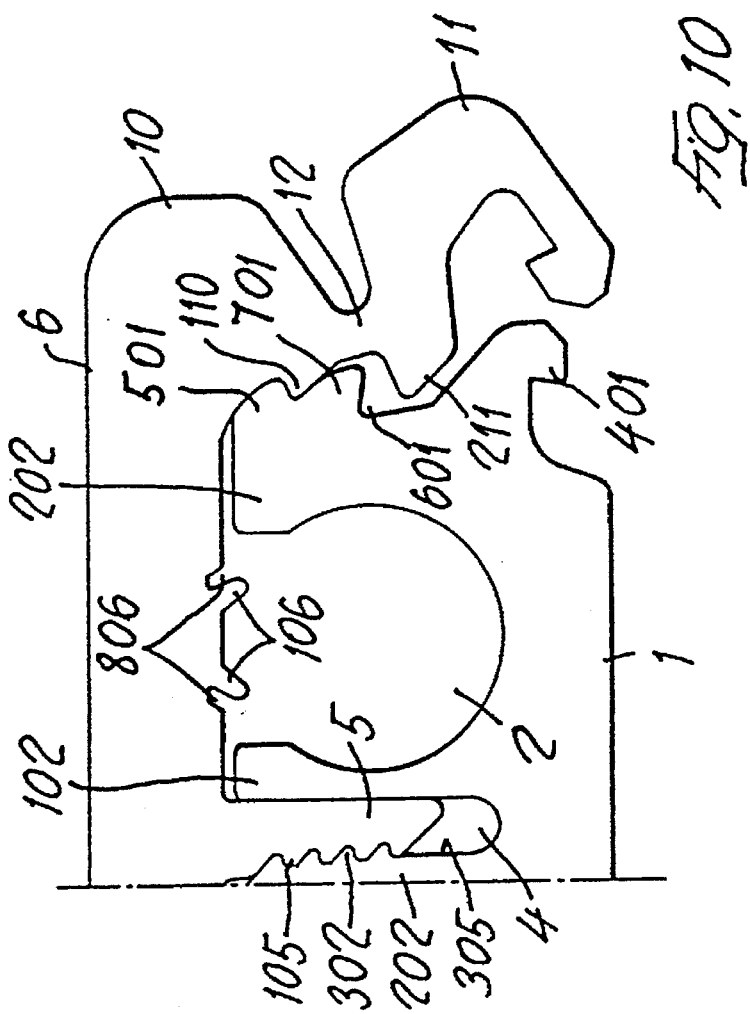
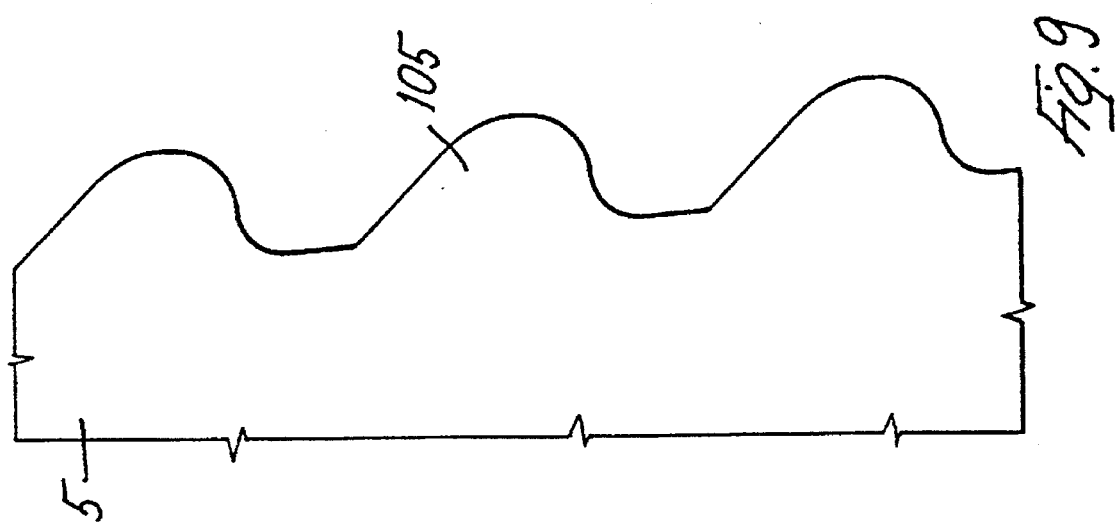

CLAMP FOR CLAMPING PIPES

This invention relates to a clamp for clamping pipes, especially but not exclusively for combustion engine supply pipes, comprising a body with at least two housing seats which are adjacent and provided with two sidepieces which encompass a pipe laterally and the pipe itself being engaged in a flexible manner between these sidepieces with a coupling notch for a catch-type distance piece being provided between the adjacent sidepieces of two adjacent housing seats with the catch-type distance piece being borne on the opposite internal side of a clamping bracket which can be clamped with the pipes being clamped against the body itself.

The said clamps for clamping pipes are widely used and particularly for the supply pipes of combustion engine injectors. The clamps are subjected to severe stresses due to significant vibrations of the engines which are transmitted through the supply pipes which are generally rigid.

The object of the invention therefore is to produce a clamp for clamping pipes of the type described in the introduction which by means of the relatively simple and inexpensive arrangements makes it possible to obtain a greater clamping strength of the tubes without however complicating the operations for clamping pipes in the clamp but rather making them easier.

These objectives are achieved according to the invention with a clamp for clamping tubes of the type described in the introduction on which the catch-type distance pieces and at least one of the cooperating sidepieces have respectively at least one matching or complementary tooth or respectively at least one tooth and at least one complementary reciprocal clamping notch.

According to a development the catch-type distance pieces are provided, at least over a partial section of their extent and at least on one side of these distance pieces which adheres to the external side of one of the two adjacent sidepieces, with a toothed portion which cooperates with a matching or complementary toothed portion on the opposite external side of the said sidepiece.

The two complementary toothed portions are advantageously provided with teeth of the sawtooth type. The teeth of the catch-type distance piece are directed with their less steep sides in the coupling direction in the coupling notch and with their steeper sides in the direction of release of the latter. The sawteeth of the toothed portion on the external side of the sidepiece are directed in the opposite and complementary direction to those of the catch-type distance piece.

The catch-type distance pieces and the associated coupling notches may be provided with any cross sections which may be complementary to each other or differ from each other. In particular they may be provided with cuneiform cross sections or with a constant thickness over their complete extension.

By means of this arrangement, in addition to guaranteeing a reciprocal restraining function of the sidepieces of the housing seats against their flexible spreading apart because of lateral pressures applied by the pipes themselves, the catch-type distance pieces make a contribution by applying by means of the cooperating toothed portions a local clamping action with the closing bracket itself in the closing condition.

The closing bracket of the clamp for clamping pipes described in the introduction is provided therefore with a plurality of intermediate clamping points at the body of the clamp distributed along its extension. These clamping points are provided advantageously so that they correspond to the intermediate zones between the pipes themselves guaranteeing the absorption of the pressure forces applied by the pipes against the closing bracket in the direction of opening of this bracket.

The pipes are therefore clamped in a more stable manner and in a manner which is more resistant to stresses. With the sawtooth configuration of the cooperating toothed portions and their complementary orientation an easy coupling of the catch-type distance pieces in the coupling notches is nevertheless achieved without requiring excessive manual forces and makes it possible to achieve the final clamping by means of consecutive compressive actions of the bracket against the body whilst maintaining the conditions obtained with each individual action.

The subject matter of the invention also includes other characteristics which result in a further improvement to the clamp for clamping pipes described above and which are the subject of the subordinate claims.

The particular characteristics of the invention and the advantages which are derived from them will be seen in greater detail from the description of some preferred embodiments which are illustrated by way of example in a non-restrictive manner in the attached drawings in which:

FIG. 1 shows a side view in the direction of the axis of the housing seats of the pipes of a first embodiment of a clamp for clamping pipes according to the invention in the open condition.

FIG. 2 shows a similar view to FIG. 1 of the clamp for clamping pipes in the closed condition and with a pipe clamped in it.

FIG. 3 shows an enlarged detail of a catch-type distance piece according to the previous figures.

FIGS. 4 to 6 show, in a similar manner to FIGS. 1 and 2, a second embodiment of the clamp for clamping pipes according to the invention respectively with the clamping bracket in various positions.

FIG. 7 shows a side view in the direction of the axis of the housing seats of the pipes of a clamp for clamping pipes according to a further development of the invention, for two pipes and in the open condition.

FIG. 8 show a similar view to FIG. 7 with the clamp for clamping pipes in the closed condition and with a pipe clamped in it.

FIG. 9 shows an enlarged detail of a catch-type distance piece according to the preceding figures.

FIG. 10 shows a detail of a similar view to FIGS. 7 and 8 relating to the reciprocal clamping means of the clamping bracket and the body on the free end of the clamping bracket.

For the sake of simplicity in the following description and in the claims, the open side of the body 1 is also defined as the upper side, whilst its base side is defined as the lower side.

With reference to FIGS. 1 to 3 a clamp for clamping pipes, especially but not exclusively supply pipes on combustion engines or the like, comprises a body 1, in which are formed two or more housing seats 2, each for a pipe 3 and which are disposed adjacent to each other. Each housing seat 2 is produced with a cross section which corresponds substantially to the section of the pipe 3 and is delimited laterally by two opposite sidepieces 102, 202 which encompass the pipe 3 laterally in particular through an angle of more than 180°. The free ends of the sidepieces 102, 202 are spaced between each other correspondingly and form a coupling opening through which the pipe 3 is held flexibly between the sidepieces 102, 202 themselves. So that the sidepieces 102, 202 can be spread flexibly, between the adjacent sidepieces 202, 102 of two adjacent housing seats 2 a coupling notch 4 is provided with which a catch-type distance piece 5 projecting from the internal side of a clamping bracket 6 cooperates. The catch-type distance piece 5 is provided with a toothed portion, the teeth 105 of which are formed in the manner of the teeth of a saw, on one of the sides cooperating with the external side of one of the two sidepieces 202 which delimit the coupling notch 4. The teeth 105 are disposed with their less steep sides directed in the coupling direction and with their steeper sides directed in the release direction in and from the coupling notch 4. The opposite external side of the corresponding sidepiece 202 is provided in its turn with a toothed portion 302 which matches with and which is complementary to the toothed portion 105 of the catch-type distance piece 5 and the teeth of which in the manner of the teeth of a saw are directed in the opposite direction to the teeth 105 of the catch-type distance piece 5 itself. The free end of the sidepiece 202 on the side of the coupling notch 4 is provided with an inclined shoulder surface 402 which is designed to cooperate with a parallel catch surface 205 provided in the connection zone of the catch-type distance piece 5 to the clamping bracket 6. The said reciprocal shoulder surfaces 402, 205 are formed by a widening flaring of the coupling opening 4 and are inclined in particular substantially so that they correspond to the less steep sides of the respective toothed portion 105, 302. The coupling notch 4 and the catch-type distance piece 5 are provided with a complementary cuneiform cross section in the example shown in FIGS. 1 to 3.

The clamping bracket 6 is provided on its internal side so as to coincide with each opening of the housing seats 2, with two webs 106 for clamping pipes 3 which when the bracket 6 itself is in the closed position adhere to the free side of the pipe 3. The said webs 106 for clamping pipes are disposed symmetrically in relation to the middle of the opening between the sidepieces 102, 202 of the corresponding housing seat 2 and engage the surface of the pipe 3 at correspondingly symmetrical points in relation to a median axial plane of the pipe whilst clamping it in the corresponding seat 2 (FIG. 2). The webs 106 are provided with a cuneiform cross section with rounded apexes and are disposed with the opposite sides which diverge between themselves towards the pipe (3) in particular according to a secant of the pipe.

The clamping bracket 6 is formed in the shape of a "U" and is composed of a crosspiece with two wings at its opposite ends parallel to the axes of the pipes 3. One of the two wings 406 is shorter than the corresponding side of the body 1 and is hinged to the body in an oscillating manner about an axis which is parallel to the axes of the pipes 3 by means of a film hinge 7. In addition the wing 406 is provided on its internal side with a notch 506 into which a lateral tooth 101 on the upper end of the opposite side of the body 1 itself is designed to engage automatically at the moment of oscillation against the body 1. The wing 206 on the opposite end of the clamping bracket 6 is longer and at its free end is provided with a tooth 306 projecting towards the body 1, with which the said wing engages from below at the base side of the body 1 in the clamping condition of the bracket 6 against the body. In this condition the opposite sides of the body 1 and of the wing 206 also adhere completely to each other one against the other.

FIGS. 4 to 6 show a second embodiment of the invention which differs in the first instance from the first embodiment by the fact that the coupling notches 4 and the catch-type distance pieces 5 have a complementary cross section and a thickness which is substantially constant over their complete extension.

A further difference relates to the formation of the clamping wing of the clamping bracket 6 on its free end. In the first place the clamping wing is provided with a provisional clamping projection 110 in the intermediate position which engages in a complementary notch 301 on the corresponding side of the body 1. The projection 110 consists of a small bulge which protrudes slightly from the internal side of the wing whilst the notch 301 is formed from a slight depression or by a notch on the opposite side of the body 1 itself. The small bulge 110 and the depression 301 are advantageously formed so that they are completely rounded.

The clamping wing of the bracket 6 is further distinguished substantially from that of the preceding example in that it is formed in two parts 10, 11 which are articulated between themselves by means of a film hinge or a material staple 12. The upper part 10 is connected rigidly to the bracket 6 whilst the lower part 11 is free to oscillate from and towards the side of the body 1. The upper part 10 of the clamping wing is provided on its articulation end with the provisional clamping intermediate bulge 110 of the bracket 6. The lower oscillating part 11 is on the other hand formed in the manner of a hook and cooperates with a check tooth 401 which has been formed in the lower zone of the opposite side of the body 1. The check tooth 401 and the lower part 11 are provided with cooperating hook hems which snap into engagement with each other with a reciprocal flexible deflection action (FIG. 4). The hook heads are provided with reciprocal check surfaces either in the direction which is perpendicular to the base side of the body 1 and in particular slightly inclined towards the middle of the body 1 in relation to the perpendicular direction or in parallel to the said base side.

According to a further characteristic the oscillating lower part 11 is provided, in the zone of its articulated end at the rigid upper part 10, with a spur 211 which protrudes towards the opposite side of the body 1 and which cooperates with a complementary notch 601 of the said side. The spur 211 and the notch 601 are provided with an upper side inclined upwards in the direction of the middle of the body 1 and a front side inclined towards the middle of the body 1 itself in the direction of the upper side of the body 1 itself and form an acute angle between them.

Unlike the embodiment according to FIGS. 1 and 2, in which the upper front side of the tooth 101 cooperating with the wing 406 hinged at the body 1, is inclined inside towards the middle of the body 1 in the direction of the upper side of the body whilst the other opposite side of the body 1 is inclined in a manner convergent with the said front side of the tooth 101, in the embodiment shown in FIGS. 4 to 6, the front side of the tooth 101 is substantially perpendicular to the lower side of the body 1 or slightly inclined outwards in the direction of its upper end whilst the opposite side of the body 1 or the part of the body which cooperates with the stationary part 10 of the clamping wing is substantially perpendicular to the lower side of the body 1.

The particular way of producing the second embodiment considerably facilitates the final clamping and locking of the bracket 6 as the provisional clamping bulge 110 of the bracket 6 makes it possible to release at least partially and temporarily the end part 11 in the manner of a hook whilst considerably facilitating the engagement and disengagement operations.

FIGS. 7 to 10 show further developments of the clamp according to the invention. The parts which are the same as or which have the same functions parts of the parts of the preceding embodiments have been given the same reference numbers in these figures.

With reference to FIGS. 7 and 8 according to an initial development, as with the film hinge 7 it is not possible to define a stable oscillation axis of the clamping bracket 6 permitting slight offsets in the position of the bracket in relation to the body 1 and consequently offsets of the complementary parts of the clamping bracket 6 and of the body 1 which engage reciprocally in the closing condition of the clamp the clamping bracket 6 and the body 1 are provided with angular cooperating guide means which guarantee their oscillation about a predetermined axis according to the correct disposition in relation to the cooperating parts of the reciprocal engagement of the bracket 6 and of the body 1 themselves. The said angular complementary guide means advantageously come to cooperate amongst themselves preferably only in the end part of the oscillation in the clamping direction of the clamping bracket 6, before the said reciprocal engagement complementary parts and in particular the catch-type distance pieces 5 and the coupling notches 4 have also come to cooperate between themselves. In the example shown (FIGS. 7 and 8) these angular guide means are made up of a guide fin 606 protruding from the internal side of the clamping bracket 6 and of a complementary guide notch 13 which are provided in the area of the hinging side of the clamping bracket 6. The guide notch 13 is formed in the body 1 in the intermediate position between the adjacent tube clamping sidepiece 102 and the head wall of the body 1 itself and at the same time also carries out a certain catch-type distance piece function whilst making it possible to form the head wall of the body 1 with a thickness which is capable of providing a certain strength and the tube clamping sidepiece 102 with a smaller thickness so as to give it the flexibility for inserting the pipe 3 into the corresponding housing seat 2. The guide fin 606 and the guide notch 13 are formed with an arched configuration in a manner corresponding to the radius of curvature relating to a predetermined hinging axis in accordance with the correct disposition of the complementary means of reciprocal engagement 4, 5, 11, 401, 110, 301, 211, 601 of the clamping bracket 6 and of the body 1 either on the side directed towards the hinging end of the clamping bracket 6 or on the opposite side. The arched guide fin 606 has a length such that when its free end corresponds to the mouth of the guide notch 13, the further means of reciprocal engagement of the clamping bracket 6 and of the body 1 are not yet joined to cooperate between themselves. On the side opposite to the hinging side of the clamping bracket 6, the guide fin 606 is tapered towards its free end whilst the initial section 213 of the associated side of the guide notch is inclined or extends radially towards the outside forming a matching widening of the guide notch itself. On the other hand the opposite side which is radially internal of the guide fin 606 and of the guide notch 13 retain their curvature for their entire extension. By means of this arrangement the guide fin 606 comes to cooperate with the guide notch 13 or with the associated surface curved according to the predetermined radius, initially only with its radially internal surface whilst the radially external surfaces of the guide fin 606 and of the guide notch 13 come to cooperate between themselves only in a second period when the clamping bracket 6 and the body 1 have been forced in a flexible manner into the position corresponding to the predetermined hinging axis so that the guide fin 606 almost automatically penetrates the guide notch 13.

As can be seen from FIGS. 7 and 8 it is advantageous when the guide fin 606 can be provided with an engagement notch 706 and the guide notch 13 can be provided with a complementary joint tooth 113 with the tooth 113 being formed in the manner of the teeth of a saw, in particular with a cut-off point which is directed with its less steep side towards the opening of the guide notch 13 itself.

A further characteristic of the embodiment according to FIGS. 7 to 10 consists of the fact that to prevent a deflection of the pipe 3 with a permanent deformation over a period due to the clamping pressure the pipe-clamping webs 106 are formed so that they are relatively flexibly yielding in the direction of spreading apart. In the example shown, in order to guarantee this type of flexible deflection a groove 806, one of the lateral walls of which consists of the end section for connection to the clamping bracket 6 of the external side of the said pipe-clamping webs 106, is provided along the external connection edge of at least one and preferably both pipe-clamping webs 106.

With reference to FIGS. 7, 8 and 10 this embodiment is also provided with preventive clamping means. The upper part 10 of the clamping wing is provided with a provisional clamping tooth 110 which is much more pronounced that the bulge illustrated in the previous examples with the cooperating notch 301 on the body 1 also being significantly deeper.

In particular the notch 301 is delimited above and below by two teeth 501 and 701, the surfaces of which directed towards the clamping bracket 6 are inclined in the clamping direction of the bracket towards the head side and are arched in a convex manner. The inclination of the said surfaces and their arching has been chosen so that in the case of the first tooth the upper surface constitutes a matching surface cooperating with the provisional clamping tooth 110 by means of which this tooth can be forced with a light pressure beyond the tooth 501 into the notch 301 whilst in the case of the second lower tooth 701 the upper surface of the tooth acts in the direction of engagement of the provisional clamping tooth 110 in the complementary notch 301. The tooth 110 and consequently the notch 301 are produced with a cuneiform shape with an opening angle of the order of 90° preferably slightly lower and are disposed with their bisector substantially parallel to the base side of the body 1.

The oscillating lower part 11 of the wing is on the other hand formed in a substantially similar manner to that of the preceding examples.

A further development in relation to the preceding examples consists of the fact that the teeth of the matching toothed portions 105 and 302 of the catch-type distance pieces 5 and of the coupling notches 4 are formed so that they are rounded. In addition the free end of the sidepiece 202 on the side of the coupling notch 4 is provided with an inclined shoulder surface 402 which is designed to cooperate either with a parallel inclined matching surface 305 provided in the form of a taper at the free end of the catch-type distance piece 5 or with the parallel catch surface 205 provided in the zone of connection of the catch-type distance piece 5 to the clamping bracket 6 in a similar manner to the preceding examples. The said surfaces 402, 205, 305 are made up respectively of a widening flaring of the coupling opening 4 of a widening of the base of the catch-type distance piece 5 and of a chamfer of the free end of the distance piece and are inclined in particular substantially in a manner corresponding to the less steep sides of the respective toothed portion 105, 302. The inclined shoulder and matching surfaces 205 and 305 and the toothed portion 105 are provided on the side of the catch-type distance piece 5 directed towards the hinging end of the clamping bracket 6 at the body 1 of the clamp. The coupling notch 4 and the catch-type distance piece 5 can be provided with complementary cross sections in a wedge configuration or with a thickness which is substantially constant over their entire length.

In the case of all embodiments the clamp for clamping pipes is preferably made of plastic material and advantageously as a piece.

Naturally the invention is not restricted to the embodiments which have just been described and illustrated but can be the subject of wide variations and modifications above all of a constructional type. Thus for example with reference to both the embodiments, instead of the toothed portions or single teeth and complementary notches the catch-type distance pieces 5 and the associated coupling notches 4 can also be provided with different reciprocal clamping means. In particular the catch-type distance pieces and the coupling notches can also be omitted with the bracket 6 and the body 1 being provided with reciprocal clamping means in intermediate positions in relation to them and preferably distributed in the intermediate zones in relation to the pipes 3. When on the other hand the clamp is formed with a single housing seat for clamping a single pipe 3 the clamping bracket 6 can be provided with clamping wings 406, 10, 11 which are formed in a similar manner to the example shown in FIGS. 4 to 6. In addition on all embodiments the bracket 6 can be free from the body 1 whilst clamping wings 206 or 10, 11 in accordance with the two illustrated embodiments are provided on both its ends. This can all be achieved without abandoning the guiding principle which has been explained above and which is claimed below.

We claim:

1. A clamp of plastic material for fixing relative to each other at least two pipes disposed adjacent to each other, especially for combustion engine supply pipes, comprising:

a clamp body having at least two housing seats disposed adjacent to each other and including openings for receiving respective pipes, each housing seat being delimited laterally by two opposite sidepieces for encompassing laterally the respective pipes, the housing seats being disposed with a spacing between their mutually adjacent sidepieces, said spacing defining a coupling notch and allowing each mutually adjacent sidepieces to flex elastically toward each other for increasing the size of the openings in the housing seats for receiving the respective pipes, outer sidepieces of said housing seats forming first and second side walls of the clamp body, the side walls carrying outward projecting catch teeth on their outsides, a clamping bracket arranged to extend over said housing seats in a clamp-closing position and comprising a crosspiece with first and second clamping wings, a film hinge hinging the first clamping wing to the first side wall of the clamp body for oscillation about an axis defined by said film hinge and parallel to the housing seats, the first clamping wing being provided with a notch capable of operative snap engagement with the catch tooth projecting outwardly from the associated first side wall of the clamp body, the second clamping wing of the clamping bracket, opposite to the film hinge, comprises an upper part connected rigidly to the crosspiece of the clamping bracket, and a lower part articulately connected to said upper part for movement in a swingable manner, a thinner material portion between a free end of the upper part and an upper end of said lower part of said second clamping wing to enable swinging movement of said lower part of said second clamping wing, an inner side of said upper part of the second clamping wing and an outer side of the associated second side wall of the clamp body being provided with complementary catch means capable of operative snap engagement in the clamp-closing position of the clamping bracket, for provisionally locking the clamping bracket in this position to the clamp body, while the lower part of said second clamping wing is maintained in an outwardly swung inactive angular position, an inwardly projecting catch tooth on a free end of said lower part of said second clamping wing and a catch tooth projecting outwardly from the associated second side wall of the clamp body, said catch teeth being moved into operative snap engagement by an inwardly directed angular movement of said lower part starting from an outwardly swung inactive position, for definitively locking the clamping bracket in the clamp-closing position to the clamp body, the crosspiece of the clamping bracket including a catch-type distance piece on an inner side thereof which, in the clamp-closing position of the clamping bracket, engages into said coupling notch between the mutually adjacent sidepieces of said housing seats for preventing these sidepieces from flexing toward each other, said catch-type distance piece having two opposed lateral surfaces associated with lateral surfaces of the adjacent sidepieces, and at least one of the lateral surfaces of the catch-type distance piece and the associated lateral surface of the respective sidepiece are provided with catch means for operative snap engagement in thee clamp-closing position of the clamping bracket.

2. The clamp according to claim 1, wherein the complementary catch means between said upper part of the second clamping wing of the clamping bracket and the associated second side wall of the clamp body, for provisionally locking the clamping bracket in the clamp-closing position, comprise at least one catch tooth projecting from an inner side of said upper part of the second clamping wing and at least one corresponding catch notch provided in an outer side of the associated second side wall of the clamping body, said catch tooth and said catch notch being capable of operative snap engagement in the clamp-closing position of the clamping bracket.

3. The clamp according to claim 1, wherein the complementary catch means between said upper part of the second clamping wing of the clamping bracket and the associated second side wall of the clamp body, for provisionally locking the clamping bracket in the clamp-closing position, comprise at least one sawtooth projecting from an inner side of said upper part of said second clamping wing and at least one sawtooth projecting from an outer side of the associated second side wall of the clamp body, said sawteeth being capable of operative snap engagement in the clamp-closing position of the clamping bracket.

4. The clamp according to claim 1, wherein said catch tooth projecting inwardly on a free end of said lower part of said second clamping wing projects from an inner side of said lower part of the second clamping wing of the clamping bracket, and said catch tooth projecting outwardly from the associated second side wall of the clamp body definitively lock the clamping bracket in its clamp-closing position to the clamp body, said catch hooks being hook-like shaped.

5. The clamp according to claim 1, wherein said catch means provide at least one lateral surface of said catch-type distance piece and on the associated lateral surface of one adjacent sidepiece are constituted of at least one tooth projecting from said lateral surface of the catch-type distance piece and of at least one tooth projecting from the associated lateral surface of said adjacent sidepiece and capable of operatively snap engaging said tooth projecting from the lateral surface of the catch-type distance piece in the clamp-closing position of the clamping bracket.

6. The clamp according to claim 1, wherein corresponding to the opening of each housing seat the crosspieces of the clamping bracket is provided on internal side with two projections adapted to clampingly engage the pipe inserted in the associated housing seat, said two projections being spaced between themselves symmetrically to the middle of the opening between the two sidepieces of the corresponding housing seat.

7. The clamp according to claim 6, wherein said projections consist of small webs which have a wedge section adapted to extend parallel to the axis of the pipe inserted in the associated housing seat, said webs being disposed with their opposite sides diverging between themselves, said webs adapted to extend in the direction of said pipe and adapted to be directed according to a secant of said pipe.

8. The clamp according to claim 7, wherein said webs are flexibly yieldable in the direction of spreading apart.

9. The clamp according to claim 8, wherein said crosspiece of the clamping bracket is provided with a groove in an angle between each web and said crosspiece on the outer side of said web.

10. The clamp according to claim 1, wherein the clamping bracket is provided with a guide fin projecting from an internal side of said crosspiece of the clamping bracket and associated with a complementary guide notch provided in said first side wall of the clamp body, said guide fin and said guide notch being arched coaxially to said axis defined by said film hinge, and said guide fin having such a length that it engages the associated guide notch in an intermediate angular position of the clamping bracket during its oscillating movement toward the clamp-closing position.

11. The clamp according to claim 10, wherein the guide fin has two opposite lateral surfaces and the associated guide notch is delimited by two opposite lateral surfaces associated with the lateral surfaces of the guide fin, one of the lateral surfaces of the guide fin and the associated lateral surface of the guide notch being arched coaxially to the axis defined by said film hinge and being capable to enter in mutual sliding contact when the guide fin engages the guide notch.

12. The clamp according to claim 11, wherein the guide fin and the guide notch are provided with complementary catch means capable of operative snap engagement in the clamp-closing position of the clamping bracket.

13. The clamp according to claim 12, wherein the complementary catch means of the guide fin and of the guide notch comprise at least two mutually snap engageable teeth projecting from associated lateral surfaces of the guide fin and of the guide notch.

* * * * *